July 27, 1965 R. A. BICKFORD 3,196,709
STEERING CONTROL WITH SWIVEL HANDLE
Filed Sept. 18, 1962
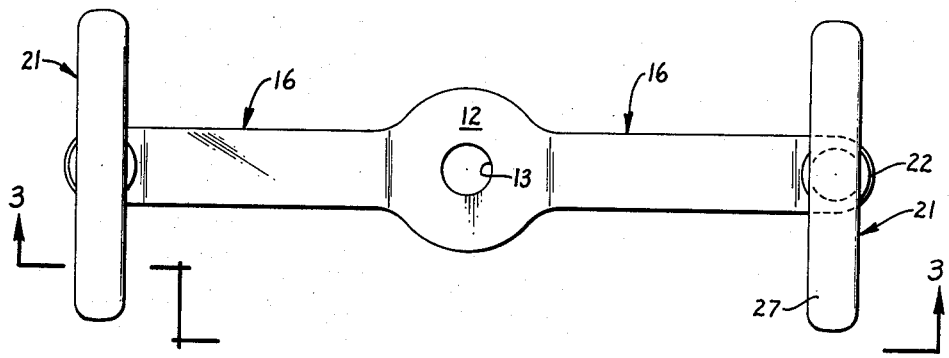
FIG. 2.
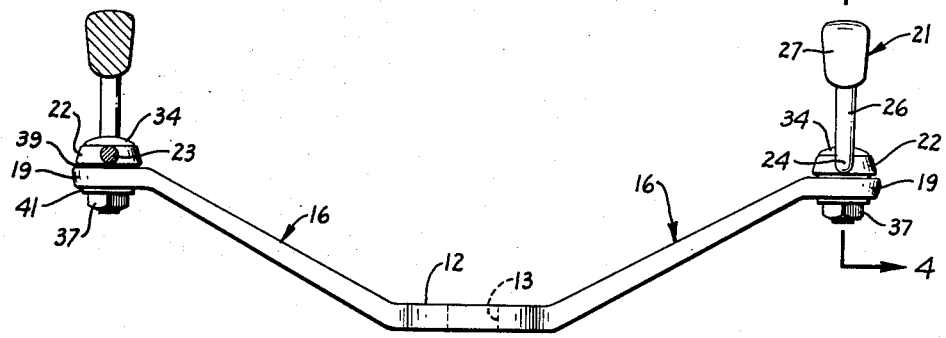
FIG. 3.
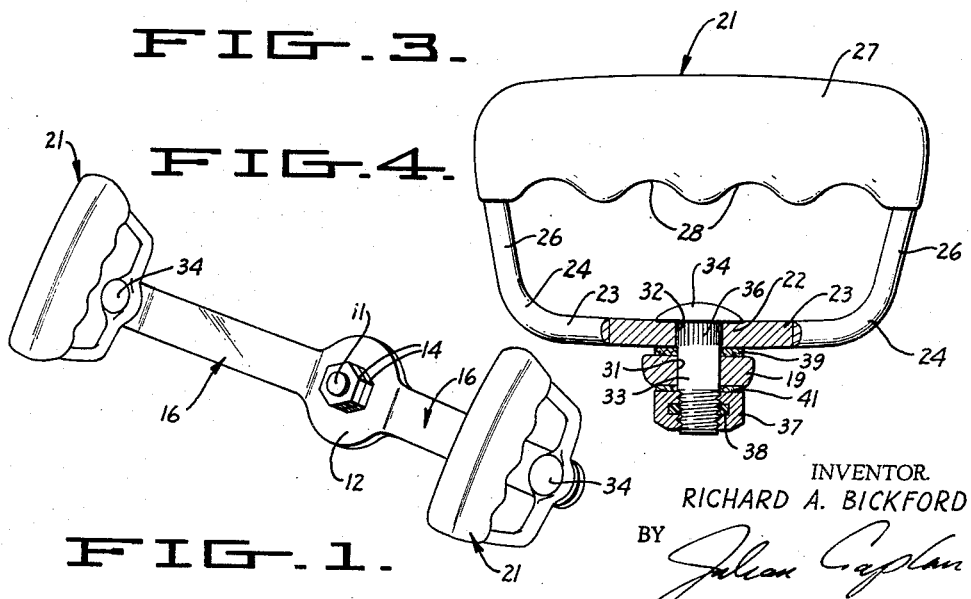
FIG. 4.
FIG. 1.
INVENTOR.
RICHARD A. BICKFORD
BY
ATTORNEY

United States Patent Office 3,196,709
Patented July 27, 1965

3,196,709
STEERING CONTROL WITH SWIVEL HANDLE
Richard A. Bickford, 611 Pierce Road, Menlo Park, Calif.
Filed Sept. 18, 1962, Ser. No. 224,314
3 Claims. (Cl. 74—557)

This invention relates to a new and improved steering control with swivel handle. More particularly the invention relates to a control for certain types of vehicles having generally projecting arms, each arm having a hand grip at its outer end, preferably the hand grip being rotative relative to the arm with adjustable means for controlling the frictional resistance to rotation of the grip relative to the arm.

It is one of the objects of this invention to provide manual steering controls for a steering column characterized by the use of hand grips which swivel on radially extending arms as distinguished from conventional steering wheels. A particular application of the invention is in Dragster and sports car vehicles of the racing type which are constructed with a "quick steering" turning ratio whereby a relatively small turning radius of the car is accomplished for each turn of the steering column. The device is also applicable in marine steering controls.

A principal advantage of the invention is that it permits steering the vehicle by the driver making relatively short generally up and down hand movements without the necessity of actually turning the column in the manner that a steering wheel is ordinarily turned. Hence the driver uses elbow and wrist movements as distinguished from body and shoulder movements. Hence less effort is required to accomplish turning or correcting the path of the vehicle and the necessary revolution of the steering column may be accomplished in a shorter period of time.

A further advantage of the invention is the fact that a more positive steering control is provided and this enables the driver to steer the vehicle with a single hand thereby freeing one hand for other uses. Such an advantage is particularly useful in Dragster racing. One hand is generally occupied in actuating the brake, the chute which is commonly used in such racing to stop the vehicle, the fuel shut-off and the magneto kill button, all of which must be actuated at the end of a run or in an emergency. Thus, even where a large degree of turn is being accomplished the vehicle may be brought to a halt, one hand being occupied with the steering and the other hand in stopping the vehicle by the controls heretofore mentioned.

The invention has further application in sports car racing where shifting of transmission gears by the gear box control lever is more frequent than in ordinary passenger vehicles. It will be understood that many sports cars have as many as four to six forward speeds and that there is a continuous shifting of gears during a race. The invention thus frees one hand for the gearing lever.

A still further feature of the invention is the fact that it improves steering control by improving the conditions under which the driver steers.

A still further feature of the invention is the provision of means for varying the tension or frictional resistance to turning of the swivel hand grip relative to the arm on which it is mounted thereby accommodating the steering to the particular "touch" of the driver.

Other objects of the present invention will become apparent upon reading the following specification and referring to the accompanying drawings in which similar characters of reference represent corresponding parts in each of the several views.

In the drawings:
FIG. 1 is a perspective view showing the invention applied to a steering column.

FIG. 2 is an enlarged front plan view of the device.
FIG. 3 is a top plan view thereof with parts broken away as indicated by line 3—3 of FIG. 2.
FIG. 4 is an enlarged vertical sectional view through the grip as indicated by line 4—4 of FIG. 3.

The steering control which comprises this invention is attached to the upper end of a steering column 11 of conventional type and not herein shown in detail. At the center of the control is a relatively flat hub 12 having a central aperture 13 through which the upper end of column 11 fits. Various means may be used to attach hub 12 to column 11 depending upon the design of the column. For purpose of this invention a pair of nuts 14 are shown on the upper threaded end of column 11 but it will be understood that various keys, bolts and the like may be used.

Projecting outwardly on either side of hub 12 is an arm 16 which is generally radial, as shown in FIG. 2, but which extends upwardly outwardly in elevation, as shown in FIG. 3. The outer end of the arm is formed in a terminus 19 which is parallel to base 13. Hence the terminus 19 is preferably elevated with respect to base 13 as best shown in FIG. 3. The precise shape and direction of radial arm 16 is subject to considerable variation by way of ornamentation, manufacturing standards and particularly the angular relation of the parts. The shape here shown has been found particularly advantageous. The width of the arm 16 tapers proceeding outwardly but terminus 19 is generally circular in shape.

A grip 21 is attached to the outer end of each arm 16 by a swivel connection. The swivel connection is a principal feature and advantage of the invention. Grip 21 has a central hub or disc 22 at the center of the bottom and has diametrically opposed outwardly horizontally extended feet 23 which merge in a bend 24 with upwardly outwardly slanted legs 26. At the upper end of each leg 26 is a hand grip 27 shaped to fit the hand of the driver and having grooves 28 on its underside to fit the fingers of the driver.

The swivel attachment of the grip 21 to terminus 19 of arm 16 is subject to a certain amount of variation. However, as illustrated herein, apertures 31 and 32 are formed in terminus 19 and disc 22, respectively. Preferably, aperture 32 is serrated. A carriage bolt 33 having an enlarged head 34 bearing on disc 22 and a serrated upper shank 36 mating with the serrations in aperture 32 passes through aperture 31 and is held in place by means of a nut 37 which is preferably of an elastic stop nut variety having a nylon insert 38. Various other means may be used to hold bolt 33 non-rotative relative to grip 21. Friction discs 39 and 41 are positioned on the top and bottom of terminus 19, such discs being preferably of leather or other compressible friction material. By tightening nut 37 the frictional resistance to turning between grip 21 and arm 16 is adjusted. It will be understood that the nut and bolt details heretofore described are subject to considerable variation. However, generally, it is desirable that the shank of bolt 33 be non-rotative relative to grip 21 and that an adjustable nut 37 be installed which varies the compressive force exerted against friction discs 39 and 41 and hence varies the effort required to turn disc 21 relative to arm 16.

In use the driver adjusts nuts 37 to the particular "touch" desired, the adjustment being held stationary by reason of the fact that nut 37 is a stop nut. Once adjusted the steering is controlled by relatively short hand movements in an up and down direction as viewed in FIG. 2 of the drawing, the movement being primarily a wrist and elbow movement. Although ordinarily the steering will be accomplished by movements of both hands, nevertheless it is apparent that a single hand can adequately control such steering movement leaving the other hand free for other duties.

Although the foregoing invention has been described in some detail, by way of illustration and example for purposes of clarity of understanding it is understood that certain changes and modifications may be practiced within the spirit of the invention and scope of the appended claims.

What is claimed is:

1. A steering control comprising a central base shaped for attachment to a steering column, a pair of arms extending outwardly from said base, each having a first aperture adjacent its outer end, a hand grip on the outer end of each said arm, said grip having a hand hold shaped to fit the hand of the driver, legs depending from said hand hold, a grip base receiving said legs and formed with a second aperture, a bolt passing through said apertures, means holding said bolt non-rotative relative to said grip, a nut in threaded engagement with said bolt, and at least one compressible friction disc interposed between said grip and arm, adjustment of said nut on said bolt varying the compressive and frictional force on said disc between said grip and arm to control and adjust the resistance to rotation of said grip relative to said arm.

2. A steering control according to claim 1, in which said arms extend outwardly relative to said central base, and also extend inwardly along the plane of said steering column towards the driver and are formed with an outer terminus generally parallel to said central base, said first apertures in said outer terminus.

3. A steering control according to claim 1 in which said friction disc is composed of leather and is compressible, the frictional resistance of said base and arm relative to said disc being dependent on the pressure of said base and arm on said disc.

References Cited by the Examiner

UNITED STATES PATENTS

| | | | |
|---|---|---|---|
| 556,540 | 3/96 | Hendryx | 287—91 |
| 2,131,649 | 9/38 | Turnage | 74—557 XR |
| 2,487,329 | 11/49 | Gerry | 287—91 XR |
| 2,557,609 | 6/51 | McFadden | 151—68 |
| 2,737,060 | 3/56 | Russell | 74—557 |
| 2,826,088 | 3/58 | Wittick | 74—557 XR |
| 2,925,294 | 2/60 | Schwartz | 287—91 X |

FOREIGN PATENTS

| | | |
|---|---|---|
| 453,187 | 12/48 | Canada. |
| 25,069 | 8/22 | France. |
| 167,509 | 2/06 | Germany. |
| 464,590 | 8/28 | Germany. |
| 95,757 | 3/60 | Norway. |

BROUGHTON G. DURHAM, *Primary Examiner.*